United States Patent [19]

Hull et al.

[11] Patent Number: 4,689,279
[45] Date of Patent: Aug. 25, 1987

[54] COMPOSITE CONTAINING NICKEL-BASE AUSTENITIC ALLOYS

[75] Inventors: Frederick C. Hull, Penn Hills Twp., Alleghany Co.; Sun-Keun Hwang, Murrysville, both of Pa.

[73] Assignee: Westinghouse Electric Corp., Pittsburgh, Pa.

[21] Appl. No.: 472,790

[22] Filed: Mar. 7, 1983

Related U.S. Application Data

[63] Continuation-in-part of Ser. No. 433,754, Oct. 12, 1982, abandoned.

[51] Int. Cl.⁴ ............................................. B32B 15/00
[52] U.S. Cl. .................................. 428/679; 148/410; 148/427; 148/428; 420/448; 420/453; 420/454; 428/680
[58] Field of Search ..................... 420/448, 453, 454; 148/410, 427, 428; 428/679, 680

[56] References Cited

U.S. PATENT DOCUMENTS 3,046,108  7/1962  Eiselstein ........................... 420/448

Primary Examiner—R. Dean
Attorney, Agent, or Firm—R. A. Stoltz

[57] ABSTRACT

A solid solution, nonmagnetic, austenitic nickel base alloy class is described. It contains: about 12 to 21 weight percent chromium; a concentration of molybdenum and/or tungsten, such that the sum of the weight percent molybdenum and one third the weight percent tungsten present is between 1 and 7 weight percent and wherein the w % tungsten is less than 12 w %; about 4 to 13 w % iron; small but effective amounts of the desulfurizing agent, manganese; and up to about 2.5 w % silicon. Carbon may be present at levels up to 0.15 w % and cobalt may be present at levels up to 2 w %. The above elements are balanced to provide alloys having a mean thermal expansion coefficient, $\alpha_{(RT-T)}$, for $T \leq 1000°$ F., of less than $8.3 \times 10^{-6}$ in./in./°F., and preferably less than $8 \times 10^{-6}$ in./in./°F.

In addition, a precipitation hardening, non-magnetic, austenitic nickel base alloy class is also described. It contains: about 12 to 21 weight percent chromium; a concentration of molybdenum and/or tungsten, such that the sum of the weight percent molybdenum and one half the weight percent tungsten is between about 2 and 8 weight percent and wherein the weight percent tungsten is less than 12 w %; up to 13 w % iron; less than 0.15 w % carbon; less than 0.5 w % manganese; less than 1.0 w % silicon; less than 2.0 w % cobalt; 1.5 to 4.5 total w % of aluminum plus titanium; and 0.7 to 4.5 total w % of columbium and/or tantalum. The above elements are balanced to provide age hardened alloys having a means thermal expansion coefficient, $\bar{\alpha}_{(RT-T)}$, for $T=1000°$ F., of less than $8 \times 10^{-6}$ in./in./°F. and preferably less than $7.9 \times 10^{-6}$ in/in/°F.

The alloys according to this invention also preferably have a high resistance to stress corrosion cracking in chloride or caustic contaminated environments.

7 Claims, 6 Drawing Figures

COMPOSITE CONTAINING NICKEL-BASE AUSTENITIC ALLOYS

This application is a continuation-in-part of application Ser. No. 433,754, filed Oct. 12, 1982, abandoned by the present inventors and owned by the present assignee.

BACKGROUND AND SUMMARY OF THE INVENTION

The present invention pertains to the field of austenitic alloys, i.e., alloys with a predominately face-centered cubic crystal structure. It is especially concerned with solid solution strengthened, non-magnetic, nickel-base, austenitic alloys having a relatively low thermal expansion coefficient and precipitation hardening, non-magnetic, nickel base, austenitic alloys also having a relatively low thermal expansion coefficient. It furthermore pertains to such alloys, with thermal expansions comparable to ferritic steels, and which have good resistance to stress corrosion cracking in caustic and chloride environments.

The thermal expansion coefficient ($\alpha$) of materials in various engineering designs becomes especially important whenever a particular component involves more than one material and a fluctuation of temperature during on-and-off operations. Frequently, mismatch in the $\alpha$ of dissimilar metals develops thermal shock or thermal stress at the joint. A prolonged exposure of the component under sustained thermal stress and an aggressive environment may cause stress corrosion cracking (SCC). Often a geometric incompatibility develops in the close fitting of two dissimilar metals due to mismatch in $\alpha$. This inhibits the use or affects and reliability of materials in many combinations that would otherwise be desirable.

The thermal expansion coefficient of the materials utilized in various component designs can become important in engineering structures such as steam turbines, gas turbines, boilers, nuclear reactors, fast breeder reactors, heat exchangers, pressure vessels, coal gasifiers, fluidized bed combustors, and vessels for production of synthetic fuels and petroleum products.

In steam turbines and heat exchangers, for example, many situations arise where an austenitic steel must be joined to or used in conjunction with, a ferritic steel. There are components in these systems typically being cycled from room temperature to an operating temperature in the range of 850° to 1050° F. where the typically large difference in the thermal expansion coefficients of the austenitic and ferritic materials gives rise to a variety of problems. For example, AISI 316 austenitic stainless steel pipe having an $\alpha$ (average thermal expansion coefficient over the temperature range of room temperature to 1000° F.) equal to $10.2 \times 10^{-6}$ in./in./°F. is welded to ferritic P22 (ASTM A387-Grade 22) steel pipe (2.25 w% Cr, 1 w% Mo, 0.5 w% Mn, 0.4 w% Si, 0.15 w% C, balance Fe) having an $\bar{\alpha}$ equal to $7.7 \times 10^{-6}$. The transition joint weld is made using an austenitic stainless steel (16 w% Cr, 8% Ni, 2 w% Mo, balance Fe) weld metal having an $\bar{\alpha}$ very similar to that of the 316 steel. In service, joints of this design are susceptible to the diffusion of carbon out of the P22 HAZ (heat affected zone) and into the 16 Cr—8 Ni—2 Mo stainless weld metal, where it precipitates. This loss of carbon from the P22 HAZ creates a plane of weakness which is susceptible to premature cracking under the stresses created in service due to the differential thermal expansion combined with pressure and bending stresses.

One attempt to resolve this problem has involved using an Incoloy 800 alloy (a trademark of the International Nickel Company for a nickel-chromium-iron base alloy) transition piece. This Incoloy 800 transition piece is welded at one of its ends to the 316 steel by a 16-8-2 weld, and welded at its other end using Inconel Filler Metal 82 (also a trademark of INCO and which meets the American Welding Society A5.14 Class ERNiCr-3 requirements) to the P22 ferritic steel. This joint design also produces carbon diffusion out of the P22 HAZ. Although the Incology 800 has an intermediate thermal expansion coefficient ($\bar{\alpha}_{(RT-1000°\ F.)} = 9.3 \times 10^6$ in./in./°F.), reducing thermal expansion stresses somewhat at the austenitic/ferritic interface, a high level of stress is still present at this weakened, critical location.

Other specific examples in which the difference in thermal expansion is important include austenitic weld cladding on a ferritic base or bimetallic plate or pipe.

In addition to the above welding problems, the difference in thermal expansion between austenitic steels and ferritic steels causes difficulty in mechanical joints with the control of interference fits, clearances or stresses, where austenitic and ferritic members interact.

Furthermore, heavy section turbine components made from austenitic stainless steels, which have high thermal expansion coefficients and low thermal conductivity can be susceptible to thermal shock (or cracking) as a result of the cyclic operation of the turbine. Steam turbine parts in which thermal shock may be a consideration include valves, steam chests, nozzle blocks, and casings.

A specific example of the importance of matching thermal expansion coefficients is provided by the following example. The horizontal joints of high temperature steam turbine casings are held together by a large number of bolts and studs. Two types of bolting materials which have been used are a 12% Cr martensitic stainless steel (Type 422) whose thermal expansion coefficient ($\alpha$) is less than the ferritic casing made of a 2¼% Cr—1% Mo ferritic steel casting and a nickel-base, precipitation hardened superalloy, whose thermal expansion coefficient is higher than the ferritic flange of the casting.

| Material | Thermal Expansion Coefficient, $\alpha$, Room Temperature to 1000° F. (538° C.) $\times 10^{-6}$ in/in/°F. |
|---|---|
| Type 422 | 6.5 |
| 2¼ Cr—1Mo | 7.7 |
| Ni—Base Superalloy | 8.5 |

Due to the thermal expansion and stress relaxation characteristics, the stresses in bolts made with these two materials respond differently during heating and in service. The initial hot stress of 12% Cr steel exceeds the cold set-up stress because of its low $\alpha$; but in long time periods at temperatures above about 850° to 900° F. (455° to 482° C.), the stress gradually drops because of stress relaxation. In contrast, the initial hot stress of superalloy bolts is low because of the higher thermal expansion, but it remains constant with time because of its low relaxation. If the cold set-up stress of the superalloy is raised to increase the hot stress and improve the joint sealing efficiency, there is a possibility of plastic yielding of the bolt during thermal transients which occur during turbine starts. Since the steam first comes in direct contact with the casing, the flange heats up more rapidly than the bolt, thus temporarily increasing, rather than decreasing, the applied stress.

In the aforementioned high temperature applications discussed above it is therefore desirable to maintain $\bar{\alpha}$ of the austenitic alloy as low as possible, and where an austenitic component must be joined to a ferritic component, $\bar{\alpha}$ of the austenitic alloy should be as close as possible to $\bar{\alpha}$ of the ferritic alloy. In addition to these considerations the alloy must also be resistant to stress corrosion cracking for usage in most elevated temperature turbine and heat exchanger applications.

Applicants have now developed a new class of austenitic, solid solution strengthened, non-magnetic, nickel-based alloys and a new class of austenitic precipitation hardening, non-magnetic, nickel-base alloys which can solve the specific problems and concerns discussed above. The range of the austenitic solid solution strengthened, nickel base alloys includes about: 12 to 21 w% Cr; an element for reducing the thermal expansion coefficient of the alloy, selected from the group consisting of Mo, W and their combinations and satisfying the following condition, $1 \leq [\text{wt\% Mo} + \frac{1}{2}(\text{w\% W})] < 7$ w% and wherein the w% W does not exceed 12 w%, about 4 to 13 w% Fe; small but effective amounts of the desulfurizing agent, Mn; up to about 2.5 w% Si; up to 0.15 w% C; and up to 2 w% Co.

In addition the average thermal expansion coefficient, $\bar{\alpha}$, of a solid solution strengthened alloy according to the present invention for the temperature range of room temperature to 1000° F. is maintained below about $8.3 \times 10^{-6}$ in./in./°F. by balancing the composition of the alloys within the class to satisfy the following condition:

$$\bar{\alpha}_{(RT-1000° F.)} = [7.658 + 0.0328 \text{ (w \% Cr)} - 0.08 \text{ (w \% Mo)} +$$

$$0.0111 \text{ (w \% Fe)} + 0.0066 \text{ (w \% Co)} - 0.0238 \text{ (w \% W)} +$$

$$0.1224 \text{ (w \% Mn)} - 0.00682 \text{ (w \% Mn)}^2 -$$

$$0.909 \text{ (w \% C)}] \times 10^{-6} < 8.3 \times 10^{-6} \text{ in./in./°F.}$$

Preferably the solid solution strengthened alloys according to the present invention are resistant to stress corrosion cracking in elevated temperature aqueous chloride ion and caustic solutions.

Preferably the solid solution strengthened alloys according to the present invention have an $\bar{\alpha}_{(RT-1000° F.)}$ less than about $8.1 \times 10^{-6}$ in./in./°F., and more preferably, less than $8.0 \times 10^{-6}$ in./in./°F.

It is also preferable that molybdenum and tungsten contents satisfy the following condition: $2.5$ wt% $< [\text{w\% Mo} + \frac{1}{2}(\text{w\% W})] < 7$ w% but wherein the w% W does not exceed 12 w%.

The range of austenitic precipitation hardening, nickel base alloys according to the present invention includes: about 12 to 21 weight percent chromium; a concentration of molybdenum and/or tungsten, such that the sum of the weight percent molybdenum and one half the weight percent tungsten is between about 2 and 8 weight percent and wherein the weight percent tungsten is less than 12 weight percent; up to 13 weight percent iron; less than 0.15 weight percent carbon; less than 0.5 weight percent manganese; less than 1.0 weight percent silicon; less than 2.0 weight percent cobalt; 1.5 to 4.0 total weight percent of aluminum plus titanium and 0.7 to 4.5 total weight percent of columbium and/or tantalum.

In addition, the average thermal expansion coefficient, $\bar{\alpha}$, of precipitation hardened alloys according to the present invention, for the temperature range of room temperature to 1000° F., can be maintained below about $8.0 \times 10^{-6}$ in/in/°F. by balancing the composition of the alloys within this class to satisfy the following condition:

$$\bar{\alpha}_{(RT-1000° F.)} = [8.00 + 0.0185 \text{ (w \% Cr)} - 0.0558 \text{ (w \% Mo)} +$$

$$0.00811 \text{ (w \% Fe)} + 0.00434 \text{ (w \% Co)} - 0.0284 \text{ (w \% W)} +$$

$$0.171 \text{ (w \% Mn)} - 0.0101 \text{ (w \% Mn)}^2 - 0.0879 \text{ (w \% Ti)} -$$

$$0.859 \text{ (w \% C)} - 0.000440 \text{ (w \% Cr)}^2 + 0.000273 \text{ (w \% Fe)}^2 +$$

$$0.000814 \text{ [(w \% Co)} \times \text{(w \% Fe)]} + 0.000923 \text{ [(w \% Mo)} \times$$

$$\text{(w \% Fe)]} + 0.00232 \text{ [(w \% Ti)} \times \text{(w \% Fe)]} \times$$

$$10^{-6} \text{ in/in/°F.} < 8 \times 10^{-6} \text{ in/in/°F.}$$

Preferably the precipitation hardened alloys according to the present invention have an $\bar{\alpha}_{(RT-1000° F.)}$ of less than $7.9 \times 10^{-6}$ in/in/°F.

It is also preferable that iron content of the precipitation hardened alloys be between about 8 and 12 w% to optimize resistance to stress corrosion cracking.

Preferably, the precipitation hardening alloys according to the present invention are resistant to elevated temperature stress corrosion cracking in aqueous chloride and/or caustic contaminated environments.

These and other aspects of the present invention will become more clearly apparent upon review of the following detailed description of the present invention in conjunction with the figures which are briefly described below:

DETAILED DESCRIPTION OF THE INVENTION

Figure 1:
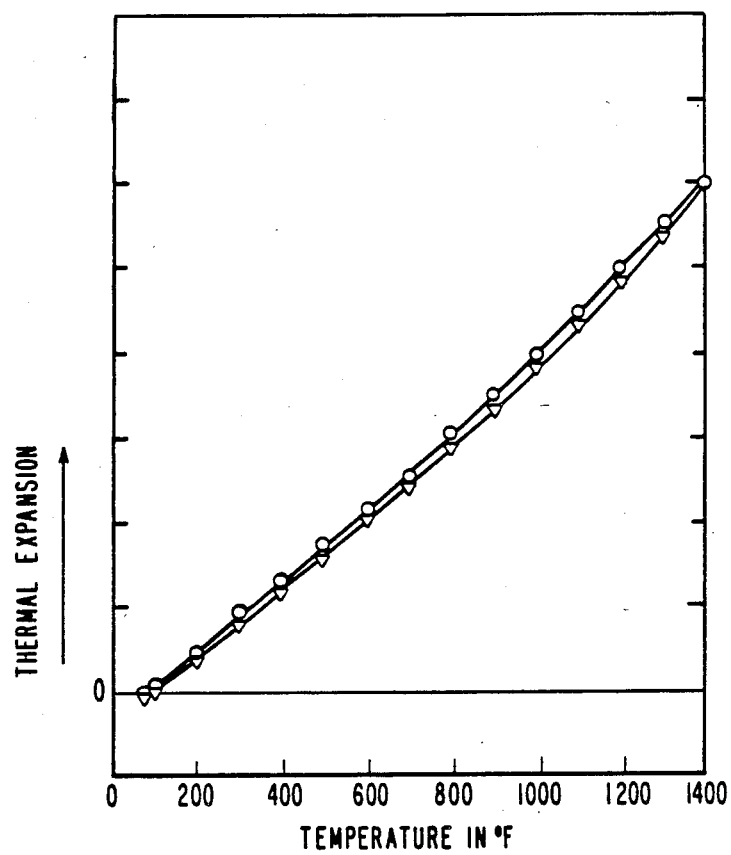
FIG. 1 shows the shape of a typical thermal expansion curve obtained for alloys according to the present invention.

By performing linear regression analyses using a variety of models and utilizing $\bar{\alpha}_{(RT-1000° F.)}$ data from a large number of nickel-base and iron-base austenitic, nonmagnetic, solid solution strengthened, commercial, as well as experimental alloys, applicants have found that the average thermal expansion coefficient $\bar{\alpha}$ (RT−1000° F.) for the solid solution strengthened alloy class according to the present invention can be closely approximated by the following equation:

$$\bar{\alpha} = [7.658 + 0.0328 (w\% \text{ Cr}) - 0.08 (w\% \text{ Mo}) + \quad (1)$$
$$0.0111 (w\% \text{ Fe}) + 0.0066 (w\% \text{ Co}) - 0.0238 (w\% \text{ W}) +$$
$$0.1224 (w\% \text{ Mn}) - 0.00682 (w\% \text{ Mn})^2 - 0.909 (w\% \text{ C})] \times$$
$$10^{-6} \text{ in./in./°F.}$$

The limits on the composition range of the solid solution strengthened alloy class according to the present invention are based on the goal of obtaining optimal thermal expansion coefficients while also obtaining high resistance to stress corrosion cracking. High nickel content promotes resistance to stress corrosion cracking, therefore the alloys of the present invention contain at least 55 w%, and more preferably at least 65 w% nickel.

While chromium increases $\bar{\alpha}$, it cannot be eliminated from these alloys, because it is needed to promote oxidation and corrosion resistance. Chromium content should be held between about 12 and 21 w%, more preferably about 12 to 18 w%, and most preferably 12 to 15 w%.

As indicated by equation (1), increasing iron content produces large increases in $\bar{\alpha}$. It is, however, believed that optimum stress corrosion cracking resistance is produced in the present alloys when the iron content is about 10 w%. Accordingly the alloys of the present invention may contain about 4 to 13 w% iron, and preferably about 4 to 10 w% in cases in which it is desirable to limit $\bar{\alpha}$ as much as possible. When stress corrosion cracking resistance is of primary importance, it is preferred that the iron content be between 8 and 12 w%.

As can be seen from equation (1), both molybdenum and tungsten act as agents for reducing the $\bar{\alpha}$ for the alloy class, with a given amount of molybdenum producing a much greater reduction than the same amount of tungsten. The addition of molybdenum and/or tungsten to reduce $\bar{\alpha}$ however, is limited by the fact that as the content of these elements in the alloy increase, the ductility of the alloy eventually decreases. Excessively high concentrations of molybdenum and/or tungsten lead to embrittlement of the alloy by the formation of sigma phase. Within the limits defined for these additions by the present invention, [w% Mo+½(w% W)]<7 w% wherein the w% tungsten does no exceed 12 wt%, and more preferably, 2.5<[w% Mo+½(w% W)]<7 w% wherein the w% tungsten does not exceed 12 w%, it is believed that alloys can be obtained having the lowest $\bar{\alpha}$ possible and without having a tendency to form sigma phase. Because of the greater effect on $\bar{\alpha}$ produced by molybdenum additions, the use of molybdenum is preferred over the use of tungsten.

Manganese may be used in small but effective amounts in the present invention as a desulfurizing agent. It has a strong tendency to increase $\bar{\alpha}$ as can be seen in equation (1). Therefore its use should be minimized and it preferably should not be present in quantities greater than 0.5 w%, and most preferably should be held below 0.1 w%.

In wrought alloy components according to the present invention, silicon may be used in small but effective amounts as a deoxidizing agent. In this use silicon contents are preferably maintained below 1.0 w%. In applications involving severe oxidizing or corrosive environments, for example fluidized bed combustors or boiler tubes, silicon content may beneficially be as high as 2.5 w%. Also castings of the alloys of the present invention may contain up to 2.5 w% Si to promote fluidity. With respect to $\bar{\alpha}$, the silicon content is not critical, in that we have found it to have no significant effect on $\bar{\alpha}$.

While from equation (1) it would appear that carbon is helpful in lowering $\bar{\alpha}$, it is believed that this effect is related to densification resulting from precipitation of carbides. Since excessive carbide precipitation could be detrimental to impact strength, ductility and corrosion behavior, it is preferred for critical applications in corrosive environments that carbon be held below about 0.08 w%, and most preferably below 0.03 w%. For solid solution type alloys, in environments where it is not critical that the selected alloy have its optimum impact strength, ductility and corrosion resistance, the carbon content may be as high as 0.15 w%. In castings the carbon content may be as high as 0.25 w%.

Cobalt increases the thermal expansion coefficient of these alloys. The alloys of the present invention should, therefore, be essentially free of cobalt. A limit of up to 2 wt%, however, has been set to cover any small amounts of cobalt that may be introduced into the alloy as an impurity in the nickel or other melting stock. Preferably cobalt should be held below 0.5 w%.

Small but effective additions of boron and/or zirconium may be optionally made to improve the creep rupture ductility of the alloy. Additions of up to about 0.02 w% maximum boron and about 0.05 w% maximum zirconium are contemplated.

The invention will be further clarified by a consideration of the following examples, which are intended to be purely illustrative of the invention.

The solid solution alloys having the nominal compositions shown in Table I were melted in MgO crucibles under a partial vacuum backfilled with 0.5 atmospheres argon. Each heat was cast into a copper mold of 1.9 cm.×5.1 cm.×15 cm. (0.75 inch×2 inch×6 inch) in size. The ingots produced were given a homogenization heat treatment at 1200° C. (2192° F.) for 4 hours under an argon atmosphere. Each heat was hot rolled at 1200° C. into 6 mm. (0.25 inch) thick plates.

TABLE I

| Heat No. | Nominal Composition* | | | | $\bar{\alpha}_{(RT-1000° F.)}$ $(10^{-6} in./in./°F.)$ | | | Corrosion Properties Failure Times (Hours) | | |
|---|---|---|---|---|---|---|---|---|---|---|
| | w% Cr | w% Mo | w% W | w% Fe | $\alpha_D$ | $\alpha_E$ | $\alpha_D - \alpha_E$ | 42% MgCl$_2$, 302° F. | 10% NaOH, 600° F. | |
| 489 | 12 | 0 | 0 | 13 | 8.30 | 8.23 | +0.07 | >5000, | >5000 | >2000, | >2000 |
| 492 | 12 | 5 | 0 | 7 | 7.79 | 7.76 | +0.03 | >5000, | >5000 | >2000, | 720–2000 |
| 493 | 12 | 5 | 0 | 13 | 7.72 | 7.83 | −0.11 | >5000, | >5000 | 720–2000, | 0–72 |
| 495 | 18 | 5 | 0 | 13 | 8.06 | 8.03 | +0.03 | >5000, | >5000 | >2000, | 720–2000 |
| 496 | 15 | 0 | 0 | 10 | 8.06 | 8.30 | −0.24 | >5000, | >5000 | >2000, | >2000 |
| 497 | 15 | 5 | 0 | 10 | 7.94 | 7.90 | +0.04 | >5000, | >5000 | >2000, | >2000 |
| 498 | 12 | 2.5 | 0 | 10 | 7.97 | 8.00 | −0.03 | >5000, | >5000 | >2000, | >2000 |
| 499 | 18 | 2.5 | 0 | 10 | 8.24 | 8.19 | +0.05 | >5000, | >5000 | >2000, | >2000 |
| 500 | 15 | 2.5 | 0 | 7 | 8.24 | 8.06 | +0.18 | >5000, | >5000 | >2000, | >2000 |
| 501 | 15 | 2.5 | 0 | 13 | 8.15 | 8.13 | +0.02 | >5000, | 2300–5000 | >2000, | >2000 |

TABLE I-continued

| Heat | Nominal Composition* | | | | $\bar{a}_{(RT-1000°\,F.)}\,(10^{-6}\,in./in./°F.)$ | | | Corrosion Properties Failure Times (Hours) | | | |
|---|---|---|---|---|---|---|---|---|---|---|---|
| No. | w % Cr | w % Mo | w % W | w % Fe | $a_D$ | $a_E$ | $a_D - a_E$ | 42% MgCl$_2$, 302° F. | | 10% NaOH, 600° F. | |
| 502 | 15 | 2.5 | 0 | 10 | 8.12 | 8.10 | +0.02 | >5000, | >5000 | >2000, | >2000 |
| 505 | 15 | 2.5 | 0 | 4 | 7.99 | 8.03 | −0.04 | >5000, | 2300–5000 | >2000, | >2000 |
| 515 | 15 | 0 | 6 | 10 | — | 8.15 | | >5000 | | >2000 | |

*All heats nominally contained about 0.4 w % Mn, 0.25% Si, 0.015 w % C with the balance being essentially Ni except for minor impurities.

Chemical analyses were performed on two heats with the results shown in Table II.

TABLE II

| Heat | | Chemical Analyses, (Weight Percent) | | | | | | |
|---|---|---|---|---|---|---|---|---|
| No. | N/A* | Ni | Cr | Mo | Fe | Mn | Si | C |
| 500 | N | 74.7 | 15 | 2.5 | 7 | .5 | .25 | .03 |
| | A | —** | 13.80 | 2.60 | 7.65 | .39 | .25 | .013 |
| 502 | N | 71.7 | 15 | 2.5 | 10 | .5 | .25 | .03 |
| | A | — | 13.80 | 2.63 | 10.71 | .39 | .25 | .016 |

*N = nominal; A = Analyzed
**— = Not Analyzed

These results show that the actual compositions of the heats are close to the nominal compositions, with the exception of Mn and C where there were apparently minor losses in melting. As reflected in Table I and in the following analyses, the nominal Mn and C compositions of all the experimental heats were changed from 0.5 w% and 0.03 w%, respectively, to 0.4 w% and 0.015 w%, respectively.

Specimens for the measurement of the thermal expansion coefficient were machined from the 6 mm. thick plates. The specimens had a 0.25 inch × 0.25 inch square cross section, and a length, parallel to the rolling direction, of 2.00 inches. Each sample had a 120 $\mu$-inch surface finish with the square end surfaces ground perpendicular to the length direction.

The temperature range of the $\alpha$ measurement was from room temperature (70° F.) to 760° C. (1400° F.) with measurements being recorded at about every 100° F. change on both heating and cooling. A dilatometer was used for the measurement of the thermal expansion. A typical thermal expansion curve produced is shown in FIG. 1 (heat 502; O = heating; ∇ = cooling). Since the slope of the thermal expansion curve increases with temperature so does the average thermal expansion coefficient. The average thermal expansion coefficient corresponding to each temperature range was calculated by dividing the relative total expansion per inch by the temperature difference. The calibration of the measurement apparatus used was checked by running an alloy having a known thermal expansion coefficient in the same apparatus, and by sending samples to an independent testing laboratory where their thermal expansion was measured in parallel with a NBS (National Bureau of Standards) reference specimen. These checks showed that the measurements made by the applicants were high and that 0.4×10$^{-6}$ in./in./°F. should be substracted from each value of $\bar{a}_{(RT-1000°\,F.)}$ caluated. These adjusted values are shown in Table I, as $\bar{a}_D$. Equation (1) was used to calculate an estimated value of $\bar{a}_E$ for each nominal composition. As also shown in Table I, $a_E$ was in good agreement with $a_D$.

As can be seen from Table I, alloys can be specifically designed within the range of the present invention using equation (1) to have $\bar{a}_{(RT-1000°\,F.)}$ less than 8.3, 8.1 or 8.0×10$^{-6}$ in./in./°F.

Specimens for SCC (stress corrosion cracking) tests were made from 2.5 mm. thick plates hot rolled at 1200° C. (2192° F.) from the 6 mm. thick plates. The hot rolled plates were solution treated at 1000° C. for 1 hour, followed by air cooling, prior to sample machining.

Figure 2:
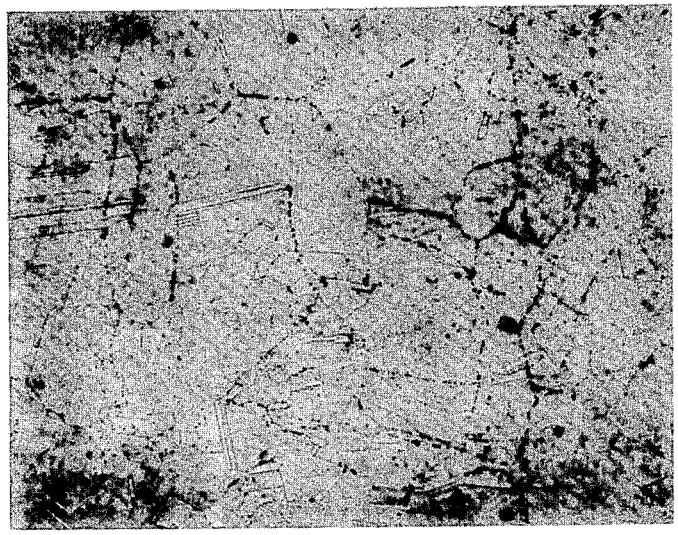
FIG. 2 shows a transverse microstructure at 200 magnification of a wrought alloy according to the present invention in a solution treated condition.
Figure 3:
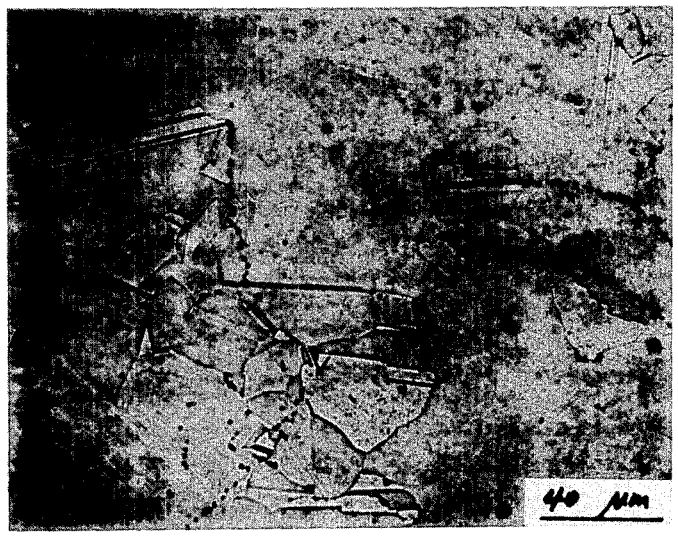
FIG. 3 shows at 500 magnifications a section of the field shown in FIG. 2.

A typical microstructure of a transverse section observed in the solution annealed plates is shown in FIG. 2 (200×) and FIG. 3 (500×). These photomicrographs are fom heat number 503 having a nominal composition identical to heat 502. This microstructure shows a well annealed structure having equiaxed grains with traces of ghost boundaries. Ghost boundaries consist of residual precipitates containing carbon and silicon aligned along prior grain boundaries. These precipitates do not make a significant contribution to the strength of the alloys of the present invention. The absence of large inclusions indicates relatively good control of alloy purity during melting and fabrication.

The sample size used for the SCC tests was 0.08 inch × 0.5 inch × 3.5 inch having ~5/16 inch diameter holes near each end going through the sample thickness. Each sample was bent over a ½ high radius mandrel at its mid length. A bolt was then passed through the aforementioned holes and a nut was threadly attached to the bolt so as to retain the bent sample in a U-shape configuration and to introduce stresses on the order of the yield strength.

Typically two samples from each heat were tested in a boiling 42% MgCl$_2$ deaerated aqueous solution at 302° F., and two samples from each heat were tested in 10% NaOH deaerated aqueous solution at 600° F. For the NaOH tests the test specimens were encapsulated in nickel cans sealed by welding. At 600° F. the internal pressure reached inside the nickel cans is approximately 1500 psi. Inspection of the specimens was performed at predetermined time intervals:

MgCl$_2$: 67, 260, 690, 1500, 2300, 5000 hours
NaOH: 72, 310, 720, 2000 hours

The convex surface of each specimen was examined with a microscope, and the ones with more than 10 suspected crack-like indications or having one or more suspected crack-like indication greater than 3 mm. in length were sectioned and re-examined metallographically. The failure time is defined as the inspection interval during which cracks longer than 100 $\mu$m were developed in the thickness direction. These times are shown in Table I. Failure time is noted in Table I as, $t_1 - t_2$, where $t_1$ is the time of the last previous inspection where failures had not yet occurred, and $t_2$ is the inspection interval at which the failure was first noted. When the failure time is shown as a greater than symbol, >, followed by an inspection time, either 2000 or 5000 hours, this indicates that failure did not occur during exposures up to these times at which the last inspection in the tests were performed.

These accelerated testing results indicate that alloys can be designed within the present invention not only having the aforementioned low thermal expansion coefficients but also with excellent stress corrosion cracking resistance in the chloride and caustic contaminated aqueous environments to which they may be exposed in high temperature steam turbine and heat exchanger environments. It can be seen in Table I that at low ($\leq$4–7 w%) or high ($\geq$13 w%) iron contents there are indications that the SCC resistance in particular environments begins to decrease.

The alloys of the present invention may be fabricated into plate, tubing, weld wire, and other shapes, or used as a casting or forging. It is specifically contemplated that this material may be used to make heavy section steam turbine parts, such as valves, steam chests, nozzle blocks and casings, where thermal shock may be a consideration. The thermal expansion coefficient of an alloy can be designed to closely approach that of the ferritic components it will be joined to during fabrication and use. It may be used as weld cladding on a ferritic base, and in bimetallic pipe and plate, where a layer composed of a ferritic alloy is bonded to a layer composed of an alloy according to the present invention.

Figure 4:
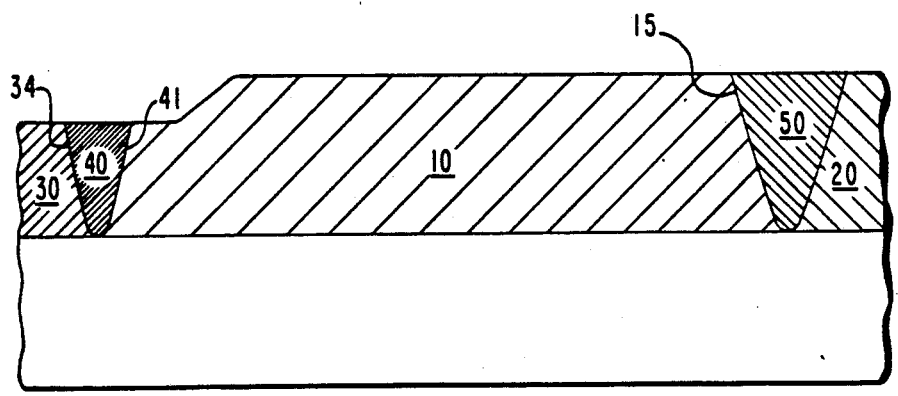
FIG. 4 shows a schematic of an embodiment of a transition joint utilizing an alloy according to the present invention.

It is specifically contemplated that the alloy of the present invention, having an average thermal expansion coefficient of between about 7.6 and $8.3 \times 10^{-6}$ in./in./°F. may be fabricated into tubing or piping and used as a transition piece between an austenitic and a ferritic component as shown in FIG. 4.

FIG. 4 schematically shows a longitudinal cross-section through a wall of a tubing transition joint between an austenitic member 30 and a ferritic member 20. For example, the austenitic member 30 may be an AISI 316 stainless steel having an $\bar{\alpha}_{(RT-1000° F.)}$ of about $10.2 \times 10^{-6}$ in./in./°F., and the ferritic member may be P22 having an $\bar{\alpha}_{(RT-1000° F.)}$ of about $7.7 \times 10^{-6}$ in./in./°F. These two members are welded to a tubing transition piece 10 composed of an alloy according to the present invention having an average coefficient of thermal expansion between about 7.6 and $8.3 \times 10^{-6}$ in./in./°F. and similar to $\bar{\alpha}$ of ferritic member 20 and weld 50.

Transition piece 10 is welded to austenitic member 30 by austenitic weld 40. Austenitic weld 40 may be a 16-8-2 alloy weld having an $\bar{\alpha}$ similar to that of member 30 or may be comprised of an alloy according to the present invention having an $\bar{\alpha}$ similar to transition piece 10. In either case stresses due to the difference in thermal expansion between weld 40 and austenitic member 30 and/or between weld 40 and transition piece 10, will be produced at interface 34 and/or interface 41, respectively.

Transition piece 10 is welded to ferritic member 20 by a low carbon ferritic weld 50 which may be a low carbon, 2.25 w% Cr-1 w% Mo-balance Fe alloy, having an $\bar{\alpha}$ similar to the ferritic member 20 and transition piece 10.

In the above manner the stresses are minimized at interface 15 where carbon migration from the ferritic weld 50 to the austenitic transition piece 10 may occur, and have been transferred to the stronger interfaces 34 and/or 41 where carbon migration is not a potential problem.

In the above enumerated applications of the solid solution strengthened alloys in accordance with the present invention in conjunction with a ferritic alloy it is desirable to have $\bar{\alpha}$ of the present invention within $\pm 0.5 \times 10^{-6}$ in./in./°F. of the $\alpha$ of the ferritic alloy.

After performing linear regression analyses using a variety of models and utilizing $\bar{\alpha}_{(RT-1000° F.)}$ data from a large number of nickel-base and iron-base austenitic non-magnetic alloys, applicants now believe that the average thermal expansion coefficient, $\bar{\alpha}_{(RT-1000° F.)}$, for precipitation hardened austenitic, non-magnetic nickel-base alloys in accordance with the present invention can be approximated by the following equation (2):

$$\bar{\alpha}_{(RT\text{-}1000° F.)} = [8.00 + 0.0185 \text{ (w \% Cr)} - 0.0558 \text{ (w \% Mo)} + \quad (2)$$
$$0.00811 \text{ (w \% Fe)} + 0.00434 \text{ (w \% Co)} - 0.0284 \text{ (w \% W)} +$$
$$0.171 \text{ (w \% Mn)} - 0.0101 \text{ (w \% Mn)}^2 - 0.0879 \text{ (w \% Ti)} -$$
$$0.859 \text{ (w \% C)} - 0.000440 \text{ (w \% Cr)}^2 + 0.000273 \text{ (w \% Fe)}^2 +$$
$$0.000814 \text{ [(w \% Co) (w \% Fe)]} +$$
$$0.000923 \text{ [(w \% Mo) (w \% Fe)]} +$$
$$0.00232 \text{ [(w \% Ti) (w \% Fe)]} - 0.00917 \text{ (w \% Al)} -$$
$$0.0163 \text{ (w \% Cb + w \% Ta)} - 0.00773 \text{ (w \% Si)]} \times$$
$$10^{-6} \text{ in./in./°F.}$$

Equation (2) is based on the model shown in Table III.

TABLE III

| Term | Coefficient | Standard Error of Coefficient | F-Ratio |
|---|---|---|---|
| Constant | 7.999 | 0.093 | |
| Co | .004340 | 0.0019 | 5.5 |
| Cr | .01848 | 0.0070 | 6.9 |
| Mo | −.05582 | 0.0033 | 283 |
| W | −.02845 | 0.0068 | 17.8 |
| Fe | .008114 | 0.0036 | 5.0 |
| Ti | −.08790 | 0.016 | 32.0 |
| Al | −.009166 | 0.012 | 0.6 |
| Cb + Ta | −.01629 | 0.014 | 1.3 |
| Mn | .1710 | 0.026 | 41.9 |
| Si | −.007729 | 0.016 | 0.2 |
| C | −.8592 | 0.15 | 33.3 |
| $Cr^2$ | −.0004399 | 0.00017 | 7.0 |
| $Fe^2$ | .0002729 | 0.000048 | 32.8 |
| CoFe | .0008136 | 0.00019 | 17.6 |
| $Mn^2$ | −.01014 | 0.0021 | 22.3 |
| MoFe | .0009228 | 0.00028 | 11.0 |
| FeTi | .002323 | 0.00071 | 10.6 |
| F-Ratio of Regression | | 346 | |
| Standard Error | | 0.21 | |
| Coefficient of Determination, $R^2$ | | 0.96 | |
| Number of Observations | | 250 | |

The limits on the composition range of the precipitation hardening alloy class according to the present invention are based on the goals of obtaining high resistance to stress corrosion cracking while obtaining low thermal expansion coefficients. High nickel content promotes resistance to stress corrosion cracking, therefore the precipitation hardening alloys of the present invention contain greater than 55 w% nickel and preferably at least 60 w% nickel.

In the present precipitation hardening alloys one of the most significant controllable factors tending to increase the thermal expansion coefficient, $\bar{\alpha}$, of these alloys is the iron content of the alloy. This is clearly shown by equation (2) and FIG. 5. Therefore, from the standpoint of minimizing $\bar{\alpha}$ alone, it is preferred that the iron content be maintained below 4 w% and more preferably below 2 w%. However, it is applicants belief that one of the critical prerequisites to obtaining maximum resistance to stress corrosion cracking, especially involving elevated temperature exposure to caustic contaminated aqueous environments is an iron content of 8 to 12 w%, preferably 9 to 11 w% or nominally 10 w% iron. Therefore, as shown in Table IV, the broad class of precipitation hardening alloys according to the present invention can be divided into two preferred subclasses. The first preferred subclass A, containing 8–12 w% iron, allows for optimization of stress corrosion cracking resistance, while achieving low, but not the lowest, thermal expansion coefficients.

TABLE IV

Precipitation Hardening Alloys

| Element | Broad | Preferred Class A | Preferred Class B |
|---|---|---|---|
| Cr | 12–21 | 12–21 | 12–21 |
| $\left(\text{Mo} + \frac{W}{2}\right)$ | 2–8 | 2–8 | 2–8 |
| Co | <2. | <2 | <2 |
| Fe | <13 | 8–12 | <4 |
| Si | <1. | <1. | <1. |
| Mn | <.5 | <.5 | <.5 |
| C | <.15 | <.15 | <.15 |
| Ti + Al | 1.5–4.0 | 1.5–4.0 | 1.5–4.0 |
| Cb + Ta | .7–4.5 | .7–4.5 | .7–4.5 |
| ΣCb + Ta + Ti + Al | ≦6 | ≦6 | ≦6 |
| Ni | * | * | * |

*essentially the balance.

The second preferred subclass B contains less than 4 w% iron thereby allowing the lowest thermal expansion coefficients to be achieved, but at the expense of aqueous caustic stress corrosion cracking resistance. This second group of preferred alloys is designed for applications when the lower thermal expansion coefficients they possess are of primary consideration and caustic SCC resistance is at most of secondary importance.

Figure 5:
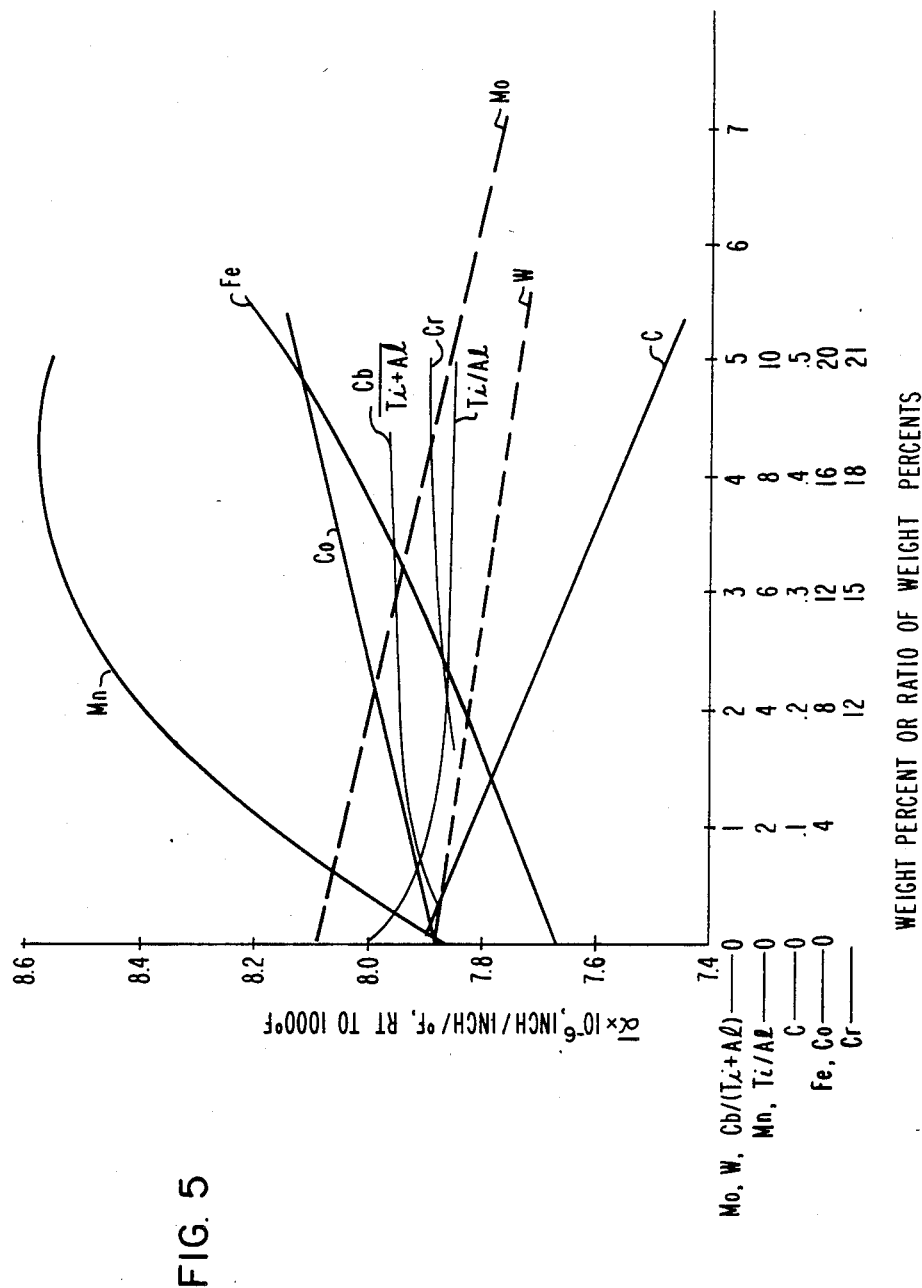
FIG. 5 shows the effects of independent concentration variations of various elements on the mean thermal expansion coefficient of a precipitation hardened alloy in accordance with the present invention.

The effect of single element variations on the thermal expansion coefficient of a hypothetical precipitation hardened alloy, No. 462, containing 15 w% Cr, 4.5 w% Mo, 10 w% Fe, 2.5 w% Ti, 0.8 w% Al, 1.0 w% Cb, 0.1 w% Mn, 0.3 w% Si, 0.03 w% C, balance Ni, have been calculated using equation (2) and are tabulated in Tables V–XIII and plotted as the curves in FIG. 5. The effect of Fe variations on $\bar{\alpha}$ are shown in Table V and plotted as the Fe curve in FIG. 5.

The following comments with respect to the remaining elements forming the precipitation hardening alloys of the present invention are applicable to each of the embodiments shown in Table IV, except as otherwise noted below.

As in the solution hardened alloys of the present invention, increasing chromium content increases $\alpha$. However, in the precipitation hardened alloys, equation (2) indicates that $\bar{\alpha}$ does not increase linearly with chromium content, but at a lower rate at chromium contents above 12 w%. Therefore, while it is believed that at least 12 w% chromium is needed to promote oxidation and corrosion resistance, the increase in $\bar{\alpha}$ with increasing chromium is relatively slight as indicated by the hypothetical alloys of Table VI and the Cr curve of FIG. 5, and up to 21 w% Cr may therefore be utilized in the precipitation hardening alloys of the present invention to obtain improved oxidation and/or corrosion resistance.

Manganese is commonly used in nickel base alloys as a desulfurizing agent and is used in that capacity in the present precipitation hardening alloys. Applicants have found, however, that at the levels typically used manganese acts to significantly increase $\bar{\alpha}$. Therefore, its use should be critically limited and preferably should not be present at levels greater than 0.5 w% and most preferably it should be kept below 0.1 w%. The effects of manganese variations on $\bar{\alpha}$ of alloy 462 are illustrated in Table VI and the FIG. 5 Mn curve.

As shown in equation (2), both molybdenum and tungsten act as agents for reducing the $\bar{\alpha}$ for this alloy class, with a given amount of molybdenum producing about twice as much reduction as the same amount of tungsten. Use of molybdenum and/or tungsten in the present invention is critical to the achievement of the desired thermal expansion coefficients. While molybdenum and/or tungsten can be present in a relatively wide range of levels, their use is limited by the fact that as the content of these elements in the alloy increase, the ductility of the alloy eventually decreases. High enough concentrations of molybdenum and/or tungsten will eventually lead to embrittlement of the alloy by the formation of sigma phase. It is believed, however, that within the limits defined for these additions by the present invention, 2 w% ≦ [% Mo + ½(w% W)] < 8 w% wherein the w% tungsten does not exceed 12 w%, and more preferably, 4 ≦ [w% Mo + ½(w% W)] < 8 w%, alloys can be obtained having the lowest possible $\bar{\alpha}$ without sigma phase formation during elevated temperature use. Phase stability calculations were conducted for the temperature range 700° to 1000° C. (1292°–1832° F.) for alloys containing up to 13 w% iron, up to 7 w% molybdenum, up to 16 w% chromium, at two hardener levels (2.5 w% titanium, 0.7 w% aluminum, 1 w% columbium, and 0.8 w% titanium, 0.5 w% aluminum, 5.0 w% columbium), and having up to 0.5 w% manganese, nominally 0.03 w% carbon and 0.5 w% silicon. It was found that these compositions would be free of sigma phase in and below the indicated temperature range. It is believed that the other compositions within the present invention will be entirely or substantially free of sigma phase during use at temperatures between 450°–700° C. (842°–1292° F.). Because of the greater effect on $\bar{\alpha}$ produced by molybdenum additions, the use of molybdenum by itself, is preferred over the use of tungsten. In alloys having a nominal iron content of 10 w%, molybdenum should preferably be greater than 2.5 w% to produce an $\bar{\alpha}_{(RT-1000°\ F.)}$ of less than $8.0 \times 10^{-6}$ in/in/°F., and about 6–8 w% or nominally 7 w% to produce an $\bar{\alpha}$ of about $7.9 \times 10^{-6}$ in/in/°F. or less. The effects of Mo and W content variations on $\bar{\alpha}$ are illustrated by the hypothetical alloys in Tables VIII and IX which are plotted as the Mo and W curves in FIG. 5.

Silicon has a statistically insignificant and negligible effect on the thermal expansion coefficient of the precipitation hardened alloys of the present invention as shown by Table III and may be present at levels up to about 1 w%. The effect of silicon on the thermal expansion coefficient of the present alloys may therefore be treated as zero.

As indicated by equation 2 and illustrated by the hypothetical alloys in Table X, cobalt additions to precipitation hardened alloys increase $\bar{\alpha}$. The $\bar{\alpha}$ of the alloys shown in Table X form the basis of the Co curve in FIG. 5. In the precipitation hardened alloys according to the present invention cobalt content should therefore be minimized and should be less than 2 w% and preferably less than 0.5 w%.

Carbon in the form of precipitated carbides lowers $\bar{\alpha}$ significantly. This affect is shown in equation (2) and illustrated by the hypothetical alloys of Table XI whose thermal expansion coefficients have been plotted against carbon content to form the C curve of FIG. 5.

In precipitation hardened alloys, carbon acts to tie up Ti and Cb in the form of carbides and should therefore be minimized. Carbon is held to less than 0.15 w% and preferably less than 0.08 w% in the precipitation hardening alloys of the present invention.

The precipitation hardening alloys of the present invention contain amounts of Ti, Al, Cb and/or Ta in amounts effective to form gamma prime, gamma double prime or gamma prime+gamma double prime phases during aging. The present alloys contain both Ti and Al, wherein the sum of Ti and Al present in the alloy is between 1.5 to 4.0 w%. Of these four elements, only the concentration of Ti was found to have statistically significant affect on $\bar{\alpha}$ (see Table III). It can be seen in equation (2) that the net result produced by increasing titanium content in the alloys according to the present invention is a decrease in $\bar{\alpha}$. It should be noted that the model represented by equation (2) assumes that the alloys are in the aged condition, in which a substantial amount of all precipitation hardening elements (Ti, Al, Cb, Ta) present are in gamma prime and/or gamma double prime precipitates.

Alloys precipitation hardened with only Ti and Al tend to be notch sensitive under creep conditions. The present invention therefore requires the presence of Cb and/or Ta to improve general creep rupture ductility of the age hardened alloys. The sum of Cb and Ta in the present invention is between 0.7 to 4.5 w%. In order to avoid alloy embrittlement, the total sum of hardening elements, Ti+Al+Cb+Ta, is maintained below about 6 w% where Cb+Ta act as the major strengthening agents and gamma double prime is the major strengthening phase. Where Ti and Al are the primary strengthening agents and gamma prime is the major strengthening phase, in order to avoid embrittlement, the sum of Ti+Al+Nb+Ta is maintained below about 4.5 w%.

The effect of Ti/Al ratio on $\bar{\alpha}$ is illustrated in Table XII. In Table XII, a series of hypothetical alloys having a constant hardening element (Ti+Al+Cb) level of 4.3 w% are shown in which the sum of Ti and Al is held constant at 3.3 w%, but the w% Ti to w% Al ratio, is varied from alloy to alloy. A plot of the resulting $\bar{\alpha}$ for these alloys is shown in FIG. 5 as the curve labeled Ti/Al. These results show that while a high Ti/Al ratio lowers $\bar{\alpha}$, the benefit beyond Ti/Al equal to about 2 is minimal. However, since precipitate coherency is optimum at w% Ti/w% Al equal to about 3, we prefer that the Ti/Al ratio be greater than or equal to 2, and we most prefer that the Ti/Al ratio be about 3, or 2.6 to 3.3.

As already mentioned Cb and/or Ta are added to the present precipitation hardening alloys to improve notch ductility. Preferably Cb alone, is used for this purpose. The affect of increasing niobium in alloys in which the content of the hardening elements (Ti, Al and Nb) are held constant at 4.3 w% is shown in Table XIII for a series hypothetical alloys for which equation (2) was used to calculate $\bar{\alpha}$. By referring to Table XIII, it can be seen that while the Cb content was varied from 1.5 to 3.5 w%, the weight percentages of Ti and Al also varied, but the ratio of w% Ti/w% Al was held constant at about 3. The calculated thermal expansion coefficients for the Table XIII alloys are plotted in FIG. 5 as a function of Cb/(Ti+Al) as the Cb/(Ti+Al) curve. It can be seen that as this ratio increases $\bar{\alpha}$ increases. Preferably, assuming the affect of Ta and Cb to be the same as Cb alone, the w% (Cb+Ta)/w% (Ti+Al) should be less than 2, and more preferably less than 1. It is most preferred that the w% (Cb+Ta)/w% (Ti+Al) be less than 0.5, or about 0.3 while the ratio of w% Ti/w% Al is between about 2.6-3.3. These most preferred conditions result in a predominately gamma prime precipitation hardening alloy in which the titanium content has been maximized to reduce $\bar{\alpha}$ while still containing an effective amount of Cb and/or Ta to improve notch ductility.

Additions of zirconium and boron may be made to these precipitation hardening alloys to improve their rupture ductility. Additions of 0.005 to 0.02 wt% boron and/or 0.005 to 0.05 w% zirconium are contemplated.

The following alloy shown in Table XIV is an example of a precipitation hardening alloy within the present invention. Alloy 2348 was processed like the solid solution alloys according to the present invention except that an ingot of 3.2×9×22 cm. was rolled down to nominally 15 mm. thick material for SCC testing.

TABLE XIV

| Alloy No. | Composition w % | | | | | | | |
|---|---|---|---|---|---|---|---|---|
| | Cr | Mo | Fe | Ti | Al | Cb | Mn | Si |
| 2348* | 15.3 | 6.8 | 10.34 | 1.08 | 0.50 | 3.05 | .02 | .43 |

*Analyzed Composition, remainder Ni except for impurities

At final size, the materials were heat treated as shown by the following schedules to place them in an aged condition.

TABLE XV

| Alloy | H.T. No. | Heat Treatment Schedule | | |
|---|---|---|---|---|
| | | Solution Treatment | 1st Ppt. Treatment | 2nd Ppt. Treatment |
| 2348 | B1 | 949° C./2 hr./AC* | 718° C./8 hr./FC** | 621° C./10 hr./AC |
| 2348 | B2 | 988° C./2 hr./AC | 718° C./8 hr./FC | 621° C./10 hr./AC |
| 2348 | B3 | 949° C./2 hr./AC | 760° C./8 hr./FC | 621° C./10 hr./AC |
| 2348 | B4 | 988° C./2 hr./AC | 760° C./8 hr./FC | 621° C./10 hr./AC |
| 2348 | B5 | 949° C./2 hr./AC | 718° C./8 hr./FC | 649° C./10 hr./AC |
| 2348 | B6 | 988° C./2 hr./AC | 718° C./8 hr./FC | 649° C./10 hr./AC |
| 2348 | B7 | 949° C./2 hr./AC | 760° C./8 hr./FC | 649° C./10 hr./AC |
| 2348 | B8 | 988° C./2 hr./AC | 760° C./8 hr./FC | 649° C./10 hr./AC |

*AC = Air Cool
**FC = Furnace cool to next treatment temperature

Alloy 2348 is predominately gamma double prime hardened.

The heat treated materials were then fabricated into U-bend specimens and then tested for stress corrosion cracking resistance as described with respect to the solid solution alloys according to the present invention. The results of the SCC tests are shown in Table XVI.

TABLE XVI

| Alloy | H.T. No. | Calculated $\alpha_{RT-1000°F.}$* | SCC Properties (Failure Times (hrs)) 10% NaOH 600° F. |
|---|---|---|---|
| 2348 | B1 | 7.9 × 10$^{-6}$ | 310–714 |

TABLE XVI-continued

| Alloy | H.T. No. | Calculated $\alpha_{RT\text{-}1000°F.}$* | SCC Properties (Failure Times (hrs)) 10% NaOH 600° F. |
|---|---|---|---|
| 2348 | B2 | " | 70–310 |
| 2348 | B3 | " | 714–2000 |
| 2348 | B4 | " | 714–2000 |
| 2348 | B5 | " | 714–2000 |
| 2348 | B6 | " | 714–2000 |
| 2348 | B7 | " | 714–2000 |
| 2348 | B8 | " | 714–2000 |

*$\alpha$ calculated using equation (2) without the statistically insignificant Al, Cb + Ta, and Si terms.

Alloy 2348 is assumed to have excellent resistance to SCC in the chloride solution, so samples were not tested in that environment. U-bend samples representing each of the eight heat treatments given to the Alloy 2348 samples, were however tested in the caustic solution, and as shown in Table XV indicate that Alloy 2348 has excellent SCC resistance in that environment in most of the heat treated conditions tested.

Alloy 2348 in the B3 precipitation hardened condition was also tensile tested at room temperature, 950° F. and 1100° F. as shown in Table XVII.

TABLE XVII

Alloy 2348 Longitudinal Tensile Properties*

| Test Temperature | Yield Str. at .2% Offset (KSI) | Ultimate Tensile Str. (KSI) | Total Elongation (%) | Reduction in Area (%) |
|---|---|---|---|---|
| 75° F. | 82.8 | 141.1 | 47 | 33 |
| 950° F. | 72.7 | 114.7 | 48 | 44 |
| 1100° F. | 71.0 | 112.1 | 50 | 50 |

*One round cross section sample tested at each temperature. Each sample had a one-inch gauge length and 0.2 inch gauge diameter. All samples tested at a cross head speed of 0.21% elongation/second.

Figure 6:
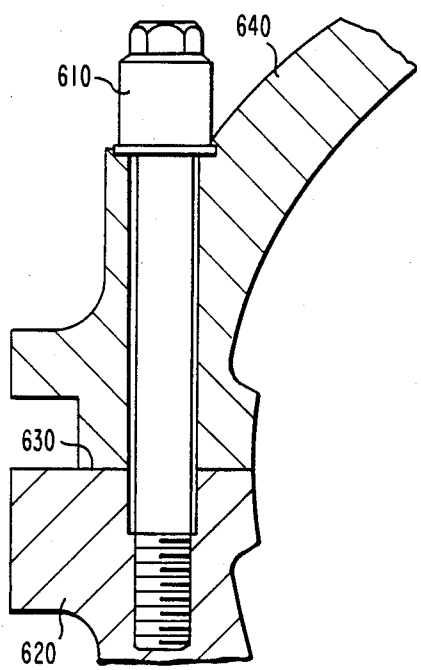
FIG. 6 shows a partial cross section through a schematic of an article of manufacture in accordance with the present invention.

FIG. 6 shows an embodiment of the present invention. In this case, one of the bolts 610 made of a precipitation hardening alloy according to the present invention is shown holding together the horizontal joint 630 formed by upper 640 and lower 620 halves of a high temperature steam turbine casing. The steam turbine casing may be made of a ferritic alloy as described in the background or a solid solution alloy according to the present invention. The bolt material is in a fully precipitation hardened condition and has been selected to match as closely as possible the thermal expansion coefficient of the casing while also exhibiting excellent resistance to elevated temperature caustic and/or chloride contaminated steam. Preferably the $\overline{\alpha}$ of the bolt matches $\overline{\alpha}_c$ of the casing within $\pm 0.3 \times 10^{-6}$ inch/inch/°F.

In addition to the aforementioned bolts, it is specifically contemplated that the precipitation hardening alloys according to the present invention may be fabricated into springs and turbine rotors, turbine disks, valve seat inserts, turbine inlet blading, and bimetals for high temperature controls.

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

TABLE V

Effect of Fe on $\overline{\alpha}$

| Alloy | Ni | Co | Cr | Mo | W | Fe | Ti | Al | Cb | Mn | Si | C | $\overline{\alpha}$ Calculated RT-1000° F. |
|---|---|---|---|---|---|---|---|---|---|---|---|---|---|
| 460 | 75.77 | 0 | 15 | 4.5 | 0 | 0 | 2.5 | 0.8 | 1.0 | 0.1 | 0.3 | .03 | 7.671 |
| 461 | 71.77 | 0 | 15 | 4.5 | 0 | 4 | 2.5 | 0.8 | 1.0 | 0.1 | 0.3 | .03 | 7.748 |
| 462 | 65.77 | 0 | 15 | 4.5 | 0 | 10 | 2.5 | 0.8 | 1.0 | 0.1 | 0.3 | .03 | 7.879 |
| 463 | 62.77 | 0 | 15 | 4.5 | 0 | 13 | 2.5 | 0.5 | 1.0 | 0.1 | 0.3 | .03 | 7.952 |
| 464 | 55.77 | 0 | 15 | 4.5 | 0 | 20 | 2.5 | 0.8 | 1.0 | 0.1 | 0.3 | .03 | 8.142 |

TABLE VI

Effect of Cr on $\overline{\alpha}$

| Alloy | Ni | Co | Cr | Mo | W | Fe | Ti | Al | Cb | Mn | Si | C | $\overline{\alpha}$ Calculated RT-1000° F. |
|---|---|---|---|---|---|---|---|---|---|---|---|---|---|
| 467 | 68.77 | 0 | 12 | 4.5 | 0 | 10 | 2.5 | .8 | 1 | .1 | .3 | .03 | 7.859 |
| 462 | 65.77 | 0 | 15 | 4.5 | 0 | 10 | 2.5 | .8 | 1 | .1 | .3 | .03 | 7.879 |
| 468 | 62.77 | 0 | 18 | 4.5 | 0 | 10 | 2.5 | .8 | 1 | .1 | .3 | .03 | 7.891 |
| 469 | 59.77 | 0 | 21 | 4.5 | 0 | 10 | 2.5 | .8 | 1 | .1 | .3 | .03 | 7.895 |

TABLE VII

Effect of Mn on $\overline{\alpha}$

| Alloy | Ni | Co | Cr | Mo | W | Fe | Ti | Al | Cb | Mn | Si | C | $\overline{\alpha}$ Calculated RT-1000° F. |
|---|---|---|---|---|---|---|---|---|---|---|---|---|---|
| 480 | 65.87 | 0 | 15 | 4.5 | 0 | 10 | 2.5 | 0.8 | 1 | 0 | .3 | .03 | 7.862 |
| 462 | 65.77 | 0 | 15 | 4.5 | 0 | 10 | 2.5 | 0.8 | 1 | .1 | .3 | .03 | 7.879 |
| 481 | 65.87 | 0 | 15 | 4.5 | 0 | 10 | 2.5 | 0.8 | 1 | .5 | .3 | .03 | 7.945 |
| 482 | 64.87 | 0 | 15 | 4.5 | 0 | 10 | 2.5 | 0.8 | 1 | 1 | .3 | .03 | 8.023 |
| 483 | 63.87 | 0 | 15 | 4.5 | 0 | 10 | 2.5 | 0.8 | 1 | 2 | .3 | .03 | 8.164 |

TABLE VIII

Effect of Mo on $\bar{\alpha}$

| Alloy | Ni | Co | Cr | Mo | W | Fe | Ti | Al | Cb | Mn | Si | C | $\bar{\alpha}$ Calculated RT-1000° F. |
|---|---|---|---|---|---|---|---|---|---|---|---|---|---|
| 470 | 70.27 | 0 | 15 | 0 | 0 | 10 | 2.5 | .8 | 1 | .1 | .3 | .03 | 8.089 |
| 471 | 67.77 | 0 | 15 | 2.5 | 0 | 10 | 2.5 | .8 | 1 | .1 | .3 | .03 | 7.972 |
| 462 | 65.77 | 0 | 15 | 4.5 | 0 | 10 | 2.5 | .8 | 1 | .1 | .3 | .03 | 7.879 |
| 472 | 63.27 | 0 | 15 | 7 | 0 | 10 | 2.5 | .8 | 1 | .1 | .3 | .03 | 7.763 |

TABLE IX

Effect of W on $\bar{\alpha}$

| Alloy | Ni | Co | Cr | Mo | W | Fe | Ti | Al | Cb | Mn | Si | C | $\bar{\alpha}$ Calculated RT-1000° F. |
|---|---|---|---|---|---|---|---|---|---|---|---|---|---|
| 462 | 65.77 | 0 | 15 | 4.5 | 0 | 10 | 2.5 | .8 | 1 | .1 | .3 | .03 | 7.879 |
| 473 | 64.27 | 0 | 15 | 4.5 | 1.5 | 10 | 2.5 | .8 | 1 | .1 | .3 | .03 | 7.836 |
| 474 | 62.77 | 0 | 15 | 4.5 | 3 | 10 | 2.5 | .8 | 1 | .1 | .3 | .03 | 7.794 |
| 475 | 60.77 | 0 | 15 | 4.5 | 5 | 10 | 2.5 | .8 | 1 | .1 | .3 | .03 | 7.737 |

TABLE X

Effect of Co on $\bar{\alpha}$

| Alloy | Ni | Co | Cr | Mo | W | Fe | Ti | Al | Cb | Mn | Si | C | $\bar{\alpha}$ Calculated RT-1000° F. |
|---|---|---|---|---|---|---|---|---|---|---|---|---|---|
| 462 | 65.77 | 0 | 15 | 4.5 | 0 | 10 | 2.5 | .8 | 1 | .1 | .3 | .03 | 7.879 |
| 476 | 60.77 | 5 | 15 | 4.5 | 0 | 10 | 2.5 | .8 | 1 | .1 | .3 | .03 | 7.942 |
| 477 | 55.77 | 10 | 15 | 4.5 | 0 | 10 | 2.5 | .8 | 1 | .1 | .3 | .03 | 8.004 |
| 478 | 50.77 | 15 | 15 | 4.5 | 0 | 10 | 2.5 | .8 | 1 | .1 | .3 | .03 | 8.066 |

TABLE XI

Effect of C on $\bar{\alpha}$

| Alloy | Ni | Co | Cr | Mo | W | Fe | Ti | Al | Cb | Mn | Si | C | $\bar{\alpha}$ Calculated RT-1000° F. |
|---|---|---|---|---|---|---|---|---|---|---|---|---|---|
| 462 | 65.77 | 0 | 15 | 4.5 | 0 | 10 | 2.5 | .8 | 1 | .1 | .3 | .03 | 7.879 |
| 487 | 65.70 | 0 | 15 | 4.5 | 0 | 10 | 2.5 | .8 | 1 | .1 | .3 | .1 | 7.819 |
| 488 | 65.60 | 0 | 15 | 4.5 | 0 | 10 | 2.5 | .8 | 1 | .1 | .3 | .2 | 7.733 |
| 489 | 65.40 | 0 | 15 | 4.5 | 0 | 10 | 2.5 | .8 | 1 | .1 | .3 | .4 | 7.561 |

TABLE XII

Effect of Ti/Al Ratio on $\bar{\alpha}$ (Ti + Al + Cb = 4.3)

| Alloy | Ni | Co | Cr | Mo | W | Fe | Ti | Al | Cb | Mn | Si | C | $\bar{\alpha}$ Calculated RT-1000° F. |
|---|---|---|---|---|---|---|---|---|---|---|---|---|---|
| 490 | 65.77 | 0 | 15 | 4.5 | 0 | 10 | 3.3 | 0 | 1 | .1 | .3 | .03 | 7.835 |
| 491 | 65.77 | 0 | 15 | 4.5 | 0 | 10 | 3 | .3 | 1 | .1 | .3 | .03 | 7.851 |
| 462 | 65.77 | 0 | 15 | 4.5 | 0 | 10 | 2.5 | .8 | 1 | .1 | .3 | .03 | 7.879 |
| 492 | 65.77 | 0 | 15 | 4.5 | 0 | 10 | 2 | 1.3 | 1 | .1 | .3 | .03 | 7.907 |
| 493 | 65.77 | 0 | 15 | 4.5 | 0 | 10 | 1.5 | 1.8 | 1 | .1 | .3 | .03 | 7.935 |
| 494 | 65.77 | 0 | 15 | 4.5 | 0 | 10 | 1 | 2.3 | 1 | .1 | .3 | .03 | 7.962 |
| 495 | 65.77 | 0 | 15 | 4.5 | 0 | 10 | .3 | 3 | 1 | .1 | .3 | .03 | 8.001 |

TABLE XIII

Effect of Cb/(Ti + Al) on $\bar{\alpha}$ (Ti + Al + Cb = 4.3; Ti/Al ≅ 3)

| Alloy | Ni | Co | Cr | Mo | W | Fe | Ti | Al | Cb | Mn | Si | C | Calculated RT-1000° F. |
|---|---|---|---|---|---|---|---|---|---|---|---|---|---|
| 496 | 65.77 | 0 | 15 | 4.5 | 0 | 10 | 2.1 | .7 | 1.5 | .1 | .3 | .03 | 7.897 |
| 497 | 65.77 | 0 | 15 | 4.5 | 0 | 10 | 1.7 | .6 | 2.0 | .1 | .3 | .03 | 7.916 |
| 498 | 65.77 | 0 | 15 | 4.5 | 0 | 10 | 1.3 | .5 | 2.5 | .1 | .3 | .03 | 7.935 |
| 499 | 65.77 | 0 | 15 | 4.5 | 0 | 10 | 1 | .3 | 3 | .1 | .3 | .03 | 7.948 |
| 500 | 65.77 | 0 | 15 | 4.5 | 0 | 10 | 0.6 | .2 | 3.5 | .1 | .3 | .03 | 7.967 |

We claim:

1. A component comprising:
   (a) a first member composed of a ferritic alloy having thermal expansion coefficient $\bar{\alpha}_{F(RT-1000° F.)}$;
   (b) a second member composed of a solid solution strengthened austenitic alloy, said austenitic alloy consisting essentially of the following elements: about 12 to 18 w% Cr;

an element for reducing the thermal expansion coefficient of said alloy, selected from the group consisting of Mo, W and their combinations, and satisfying the following conditions $1 \leq [w\% \text{ Mo} + \frac{1}{2}(w\% \text{ W})] \leq 7$ w%, wherein the w% W is less than 12 w%;

about 4 to 13 w% iron;

a small but effective amount of the desulfurizing agent, Mn;

up to about 2.5 w% Si;

up to 0.15 w% C;

up to 2 w% Co;

wherein said solid solution strengthened alloy is a solid solution strengthened nickel base alloy;

and wherein the average thermal expansion coefficient, $\alpha$, of said solid solution strengthened alloy for the temperature range of room temperature to 1000° F. is maintained below about $8.3 \times 10^{-6}$ in./in./°F. by balancing the composition of said solid solution strengthened alloy to satisfy the following condition:

$\overline{\alpha} = [7.658 + 0.0328 \text{ (w\% Cr)} - 0.08 \text{ (w\% Mo)} + 0.0111 \text{ (w\% Fe)} + 0.0066 \text{ (w\% Co)} - 0.0238 \text{ (w\% W)} + 0.1224 \text{ (w\% Mn)} - 0.00682 \text{ (w\% Mn)}^2 - 0.909 \text{ (w\% C)}] \times 10^{-6} < 8.3 \times 10^{-6}$;

(c) a joint joining said first member to said second member;

(d) and wherein $|\overline{\alpha} - \overline{\alpha}_F|_{(RT-1000° F.)} \leq 0.5 \times 10^{-6}$ in./in./°F.

2. The combination according to claim 1 wherein said joint is a mechanical joint.

3. The combination according to claim 1 wherein said joint is a welded joint.

4. The combination according to claim 1 further comprising: a third member composed of a second austenitic alloy; and a second joint joining said third member to said second member.

5. The combination according to claim 4 wherein said second austenitic alloy has a thermal expansion coefficient, $\overline{\alpha}_{A(RT-1000° F.)}$, which is greater than $\overline{\alpha}$ and $\overline{\alpha}_F$.

6. A component comprising:

(a) a first member composed of a ferritic alloy having a thermal expansion coefficient, $\overline{\alpha}_{F(RT-1000° F.)}$;

(b) a second member composed of a precipitation hardened austenitic alloy in a fully aged condition, said precipitation hardened austenitic alloy comprising:

about 12-21 w% Cr;

an element for reducing the thermal expansion coefficient of said alloy, selected from the group consisting of Mo, W and their combinations, and satisfying the following conditions:

$2 \leq [w\% \text{ Mo} + \frac{1}{2}(w\% \text{ W})] < 8$ and wherein the w% W is less than 12 w%;

about 8 to 12 w% Fe;

about 1.5 to 4.0 w% total, of elements selected from the group consisting of Ti, Al and their combinations;

about 0.7 to 4.5 w% total, of an element for enhancing creep rupture strength, selected from the group consisting of Cb, Ta and their combinations;

wherein the concentration of Ti, Al, Cb and Ta are balanced to produce gamma prime phase upon aging and the sum of the w% $(\text{Ti} + \text{Al} + \text{Ta} + \text{Nb}) \leq 4.5$;

less than 0.5 w% Mn;

up to about 1 wt% silicon;

up to 0.15 w% C;

up to 2 w% Co;

and the balance essentially nickel;

and wherein the average thermal expansion coefficient, $\overline{\alpha}$, of said alloy in a fully aged condition, for the temperature range of room temperature to 1000° F. is below about $8.0 \times 10^{-6}$ in/in/°F.;

(c) wherein, said first member is joined to said second member;

(d) and wherein $|\overline{\alpha} - \overline{\alpha}_F|_{(RT-1000° F.)} \leq 0.3 \times 10^{-6}$ in/in/°F.

7. A component comprising:

(a) a first member composed of a ferritic alloy having a thermal expansion coefficient, $\overline{\alpha}_{F(RT-1000° F.)}$;

(b) a second member composed of a precipitation hardened austenitic alloy in a fully aged condition, said austenitic precipitation hardening alloy comprising:

about 12-21 w% chromium;

an element for reducing the thermal expansion coefficient of said alloy, selected from the group consisting of Mo, W and their combinations, and satisfying the following conditions:

$2 \leq [w\% \text{ Mo} + \frac{1}{2}(w\% \text{ W})] < 8$ and wherein the w% W is less than 12 w%;

up to 13 w% Fe;

less than 0.15 wt% C;

less than 0.5 w% Mn;

less than 0.1 w% Si;

less than 2.0 w% Co;

1.5 to 4.0 total w% of Al plus titanium, and wherein the w% Ti/w% Al $\geq 2$;

0.7-4.5 w% total, of an element selected from the group consisting of Cb, Ta alone or in combination with each other, wherein the w% (Ta+Nb)/w% (Ti+Al) < 2;

wherein the sum of the w% (Ti+Al+Cb+Ta) $\leq 6$;

the balance of said alloy essentially nickel; and wherein said alloy has an average thermal expansion coefficient in the aged condition, for the temperature range of room temperature to 1000° F. of less than $8 \times 10^{-6}$ in/in/°F.;

(c) wherein, said first member is joined to said second member;

(d) and wherein $|\overline{\alpha} - \overline{\alpha}_F|_{(RT-1000° F.)} \leq 0.3A \times 10^{-6}$ in/in/°F.

* * * * *